(12) United States Patent
Staples et al.

(10) Patent No.: US 7,612,682 B2
(45) Date of Patent: Nov. 3, 2009

(54) LOCATOR WITH REMOVABLE ANTENNA PORTION

(75) Inventors: Greg Staples, Stinson Beach, CA (US); George Crothall, San Jose, CA (US); James W. Walte, Los Gatos, CA (US)

(73) Assignee: Metrotech Corporation, Santa Clara, CA (US)

( * ) Notice: Subject to any disclaimer, the term of this patent is extended or adjusted under 35 U.S.C. 154(b) by 286 days.

(21) Appl. No.: 11/445,085

(22) Filed: May 31, 2006

(65) Prior Publication Data
US 2007/0013379 A1 Jan. 18, 2007

Related U.S. Application Data

(60) Provisional application No. 60/688,489, filed on Jun. 7, 2005.

(51) Int. Cl.
*G08B 21/00* (2006.01)

(52) U.S. Cl. .................. 340/657; 340/691.6; 340/693.9

(58) Field of Classification Search .............. 340/657, 340/691.1, 691.6, 693.5, 693.9, 693.12, 658, 340/636.12–636.15, 551; 324/329, 67
See application file for complete search history.

(56) References Cited

U.S. PATENT DOCUMENTS

| | | | | |
|---|---|---|---|---|
| 5,043,666 A | * | 8/1991 | Tavernetti et al. | 324/326 |
| 5,093,622 A | * | 3/1992 | Balkman | 324/326 |
| 5,430,379 A | * | 7/1995 | Parkinson et al. | 324/329 |
| 5,828,219 A | * | 10/1998 | Hanlon et al. | 324/529 |
| 6,819,109 B2 | * | 11/2004 | Sowers et al. | 324/329 |
| 7,113,124 B2 | * | 9/2006 | Waite | 342/22 |
| 7,282,920 B2 | * | 10/2007 | Mizuno | 324/329 |

* cited by examiner

*Primary Examiner*—Toan N Pham
(74) *Attorney, Agent, or Firm*—Haynes & Boone LLP

(57) ABSTRACT

A locator is disclosed that includes a base module and an antenna module. The base module and antenna module are coupled both mechanically and electrically at a joint. Such an arrangement allows for easy stowage and shipment of the locator as well as the ability, by interchanging antenna modules, to provide multi-functional locators.

9 Claims, 5 Drawing Sheets

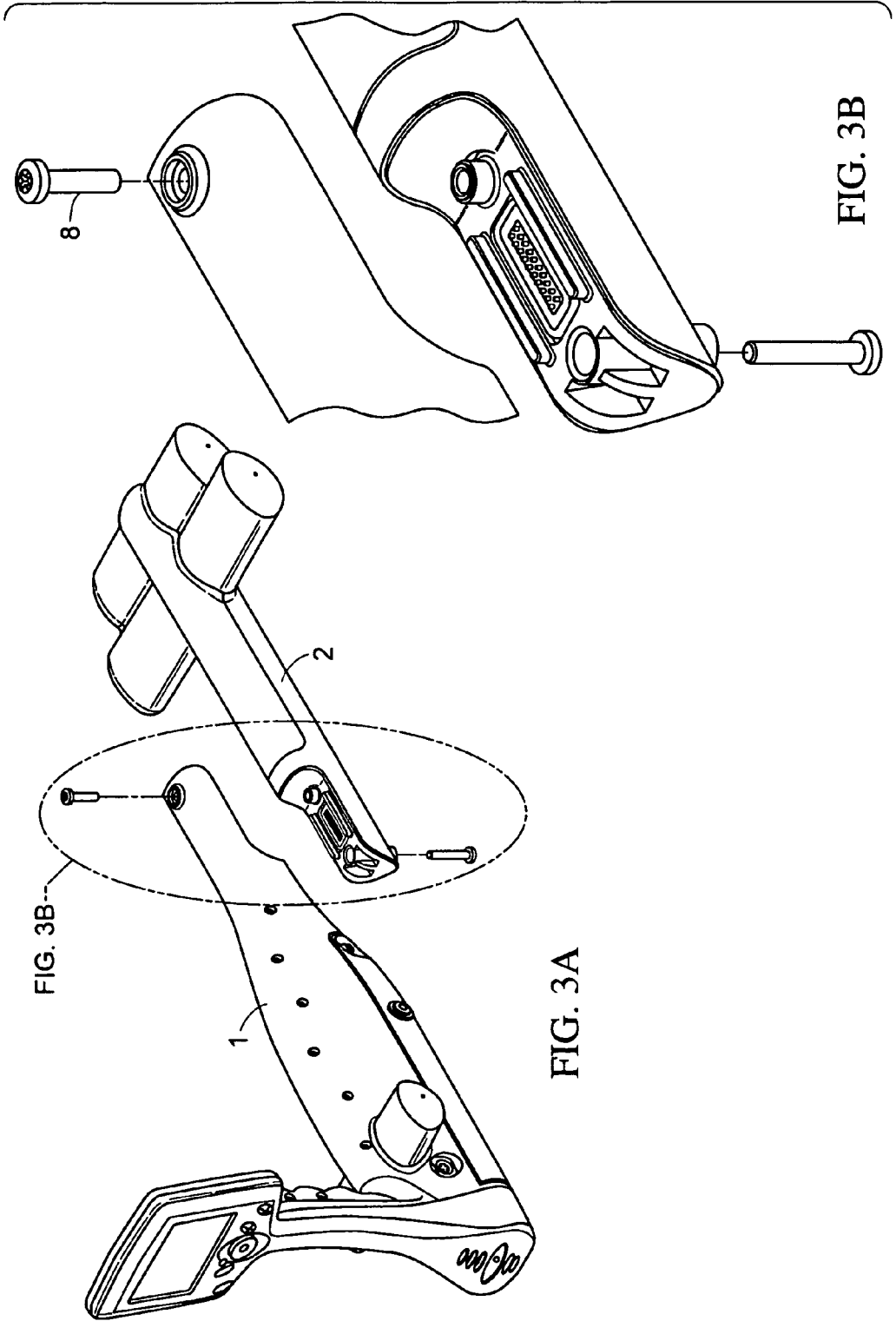

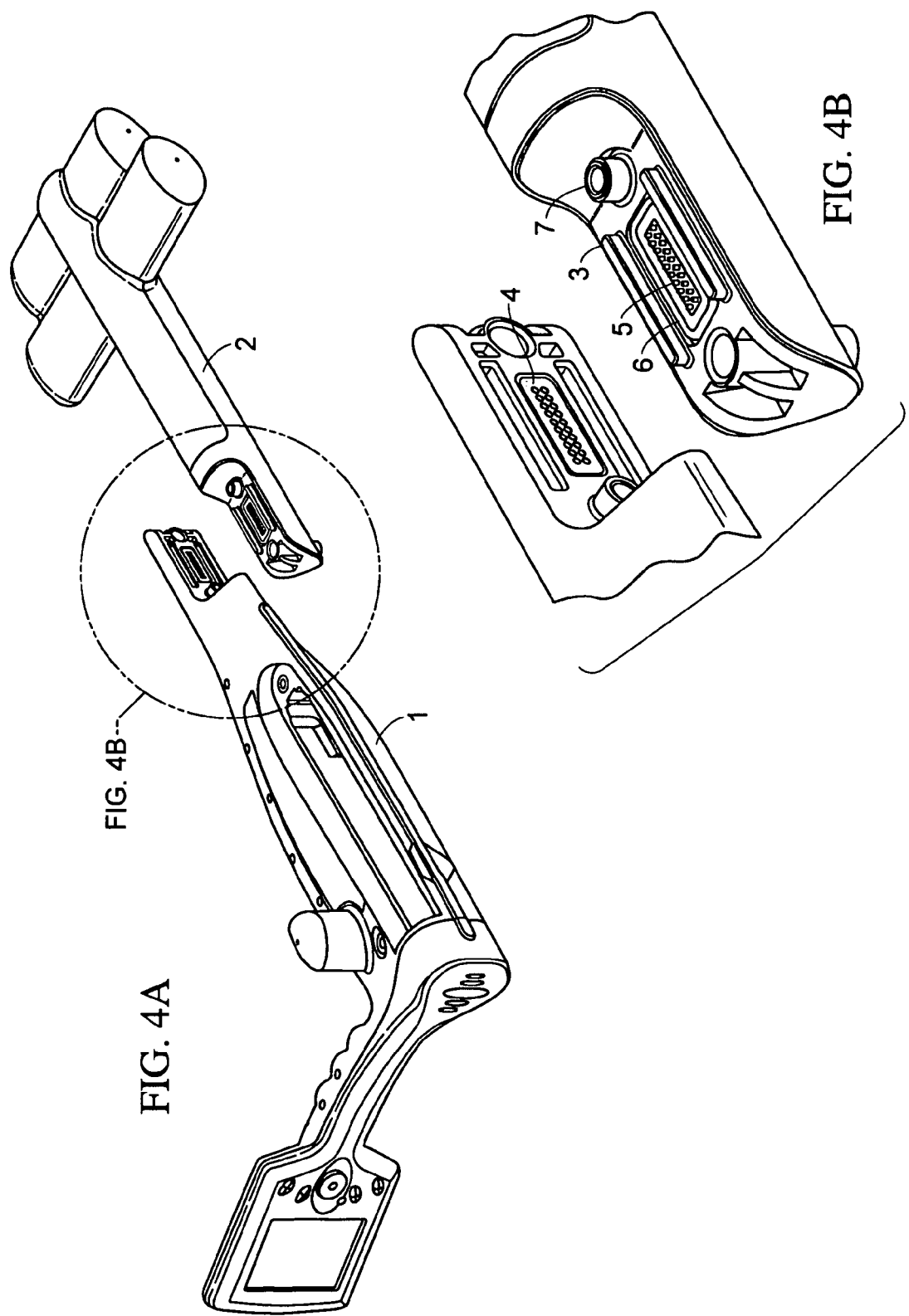

LOCATOR WITH REMOVABLE ANTENNA PORTION

RELATED APPLICATIONS

This application claims the benefit of Provisional Application No. 60/688,489, filed Jun. 7, 2005, which is hereby incorporated by reference in its entirety.

BACKGROUND

1. Field of the Invention

The present invention is related to underground structure locators, and in particular to a line locator or marker locator with a removable antenna portion.

2. Background of the Invention

Line locators are utilized in determining the location of underground pipes and cables. In general, a line locator includes one or more antennas positioned to detect the magnetic field emitted from an underground cable or pipe. The underground cable or pipe may be coupled to a transmitter so that current flowing through the cable or pipe generates the magnetic field that is detected by the locator.

Marker locators are utilized in determining the location of buried resonant markers. Markers are often laid in proximity to a cable or pipe. For example, a gas pipe, which would not be detectable by a line locator, can be located with markers adjacent the pipe. A marker locator generates an electromagnetic wave and detects the reflected wave from the marker. In some cases, markers are configured to reflect electromagnetic radiation of a selected frequency that is distinctive of the utility being located.

Both a line locator and marker locator are relatively large, elongated instruments that may be delicate in nature. As such, locators may be difficult to store or ship in a reasonable fashion. Further, several locators may be required on a truck because of the need to locate cables and pipes of multiple utilities. Storing several locators on the service truck yields additional difficulties.

Therefore, there is a need to provide a locator that is easily stored and that may be utilized for more than a single function.

SUMMARY

In accordance with the invention, a locator is disclosed with a removable antenna module. The removable antenna module is attached to a base module through electrical connectors. As such, a locator may be compatible with several different antenna modules or antenna modules can be swapped between locator units.

A locator according to the present invention includes a base module and an antenna module, wherein the base module and the antenna module are electrically and mechanically coupled in a removable fashion.

A base module of a locator according to the present invention includes electronics for receiving and processing data from an antenna module, an electrical coupler for accepting an electrical connection to the antenna module, and a mechanical coupler for mechanically coupling to the antenna module.

An antenna module for a locator according to the present invention includes at least one electromagnetic field detector, an electrical coupler for accepting an electrical connection to a base module, the base module receiving signals from the at least one electromagnetic field detector, and a mechanical coupler for mechanically coupling to the base module.

These and other embodiments are discussed more fully below with respect to the following figures.

BRIEF DESCRIPTION OF THE DRAWINGS

FIGS. 3A and 3B illustrate coupling of the modules of a locator according to some embodiments of the present invention.

FIGS. 4A and 4B further illustrate coupling of the modules of a locator according to some embodiments of the present invention.

In the figures, elements having the same designation have the same or similar function.

DETAILED DESCRIPTION

A locator according to embodiments of the present invention includes a make and break connection between a base electrical and mechanical enclosure and a variety of RF antenna modules. The RF modules can allow the base unit a range of functionality, such as, for example, operating as a line locator or a marker locator. The joint between the base electrical and mechanical enclosure and the RF modules can be mechanically suitable for the range of operating environments required for commercial line and marker location. The joint can be robust and environmentally sealed. The modular approach to a system that is both RF and digital brings utility advantages to the end user and improves the ability of the manufacturer to iterate products. The modular approach allows a flexible base platform to operate with a wide variety of different RF modules, for example a line locator antenna or a marker locator antenna.

Figure 1:
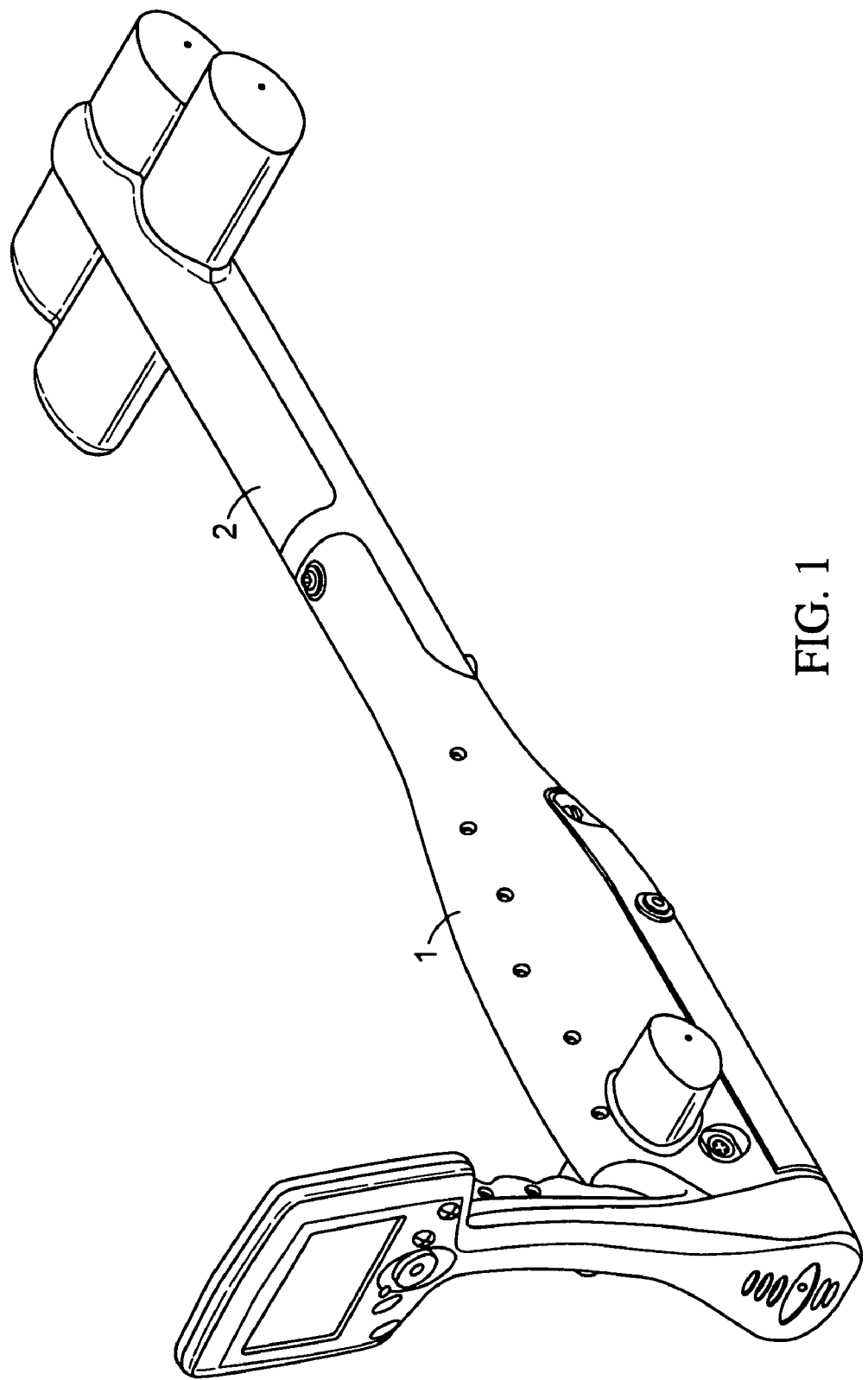
FIG. 1 illustrates an embodiment of a locator according to the present invention.

FIG. 1 illustrates a locator according to some embodiments of the present invention. As shown in FIG. 1, the locator includes a base module 1 and an antenna module 2. In some embodiments, the joint between base module 1 and antenna module 2 can be mechanically strong and environmentally sealed and includes an electrical connection. Therefore, the locator can be quickly and easily separated and reconnected. The joint allows the locator to be separated for easier shipping and transport. Additionally, the joint allows the unit to be reconfigured to perform different tasks by attaching functionally different, but compatible, antenna modules 2 to base module 1.

Figure 2A:
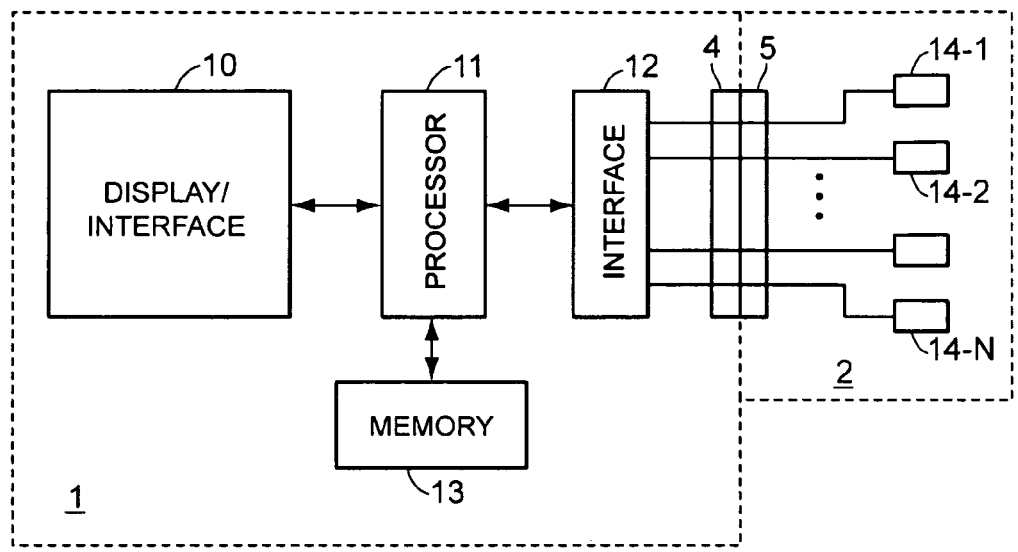
FIGS. 2A through 2C illustrate an example circuit diagram in a locator according to some embodiments of the present invention.

FIG. 2A illustrates an example of an electronic configuration for the locator illustrated in FIG. 1. Base module 1 can include a display/user interface 10, a processor 11, a memory 13, and an interface 12. Processor 11 controls operation of the locator and interacts with the user through display/interface 10. Data and instructions can be stored in memory 13. Interface 12 interfaces processor 11 with devices 14-1 through 14-N in antenna module 2. Interface 12 can include, for example, digital-to-analog converters, analog-to-digital converters, filters, timers, and other electronics for interfacing between devices 14-1 through 14-N and processor 11. Devices 14-1 through 14-N in antenna module 2 can be, for example, magnetic field detectors and transmitter antennas. In some embodiments, some signal processing circuitry can be included in devices 14-1 through 14-N. Base module 1 and antenna module 2 are joined by compatible electrical connectors 4 and 5.

Figure 2B:
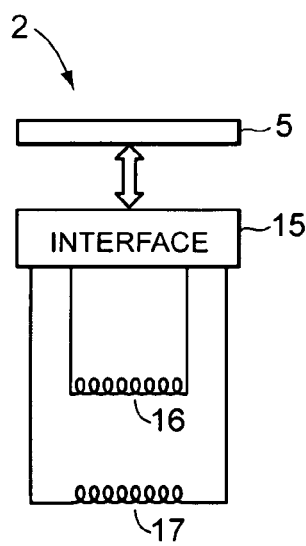

FIG. 2B illustrates an example antenna module 2 appropriate for a line locator. Magnetic field detection coils 16 and 17 are coupled through interface 15 to electrical connector 5. Interface 15 can include filters, digital-to-analog converters, and other electronics for processing signals received from detectors 16 and 17.

Figure 2C:
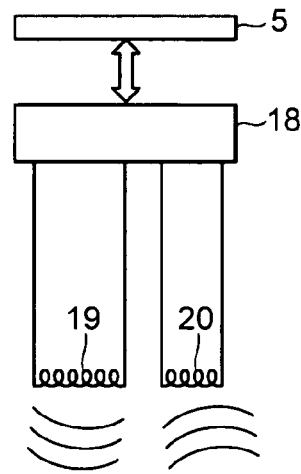

FIG. 2C illustrates an example antenna module 2 appropriate for a marker locator. Interface 18 is coupled to a transmission antenna 19 and a detection antenna 20. Signals are coupled to interface 18 through electrical connector 5. As discussed above, electromagnetic radiation is emitted by antenna 19 and reflected energy from a marker is detected at antenna 20.

FIGS. 3A and 3B illustrate an embodiment of a mechanical connection between base module 1 and antenna module 2. In the embodiment shown, base module 1 and antenna module 2 are mechanically held together by two screws. Further, the joint provides engagement ribs 3 and posts 7 which align base module 1 with antenna module 2, while providing both lateral and axial support to the joint. Two screws 8 can be used to provide clamping forces and torsional rigidity between base module 1 and antenna module 2. In some embodiments, other mechanical support systems such as, for example, clamps or bayonet style attachments can be utilized.

FIGS. 4A and 4B illustrate further the joint area between base module 1 and antenna module 2. A multi-circuit electrical connection is made between base module 1 and antenna module 2 at this joint. In some embodiments, a PCB assembly 4 mounted in base module 1 utilizes contact pads that interface with pogo-pin style spring loaded contacts of a PCB assembly 5 mounted in antenna module 2. This style of electrical interface allows repeated connections and disconnections and compensates for any misalignments due to manufacturing process. Also shown in FIG. 4B is a positive engagement rib 3 in antenna assembly 2 designed to fit within a slot in base module 1 and posts 7 designed to fit into a slot in base module 1.

Additionally, a rubber seal 6 can be incorporated in the joint. Seal 6 surrounds the electrical interface of the PCB assemblies 4,5. The clamping force provided by screws 8 compresses the rubber seal 6 between base module 1 and antenna module 2, providing a water tight seal and protecting the electrical connection.

Figure 5A:
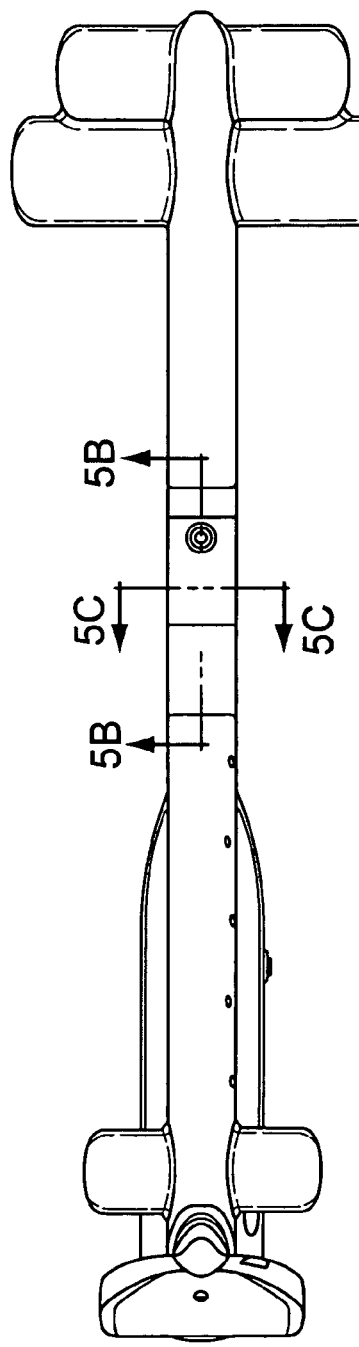
FIGS. 5A through 5C further illustrate coupling of the modules of a locator according to some embodiments of the present invention.
Figure 5C:
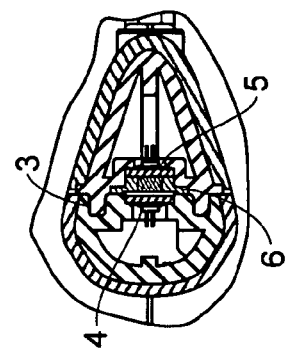
Figure 5B:
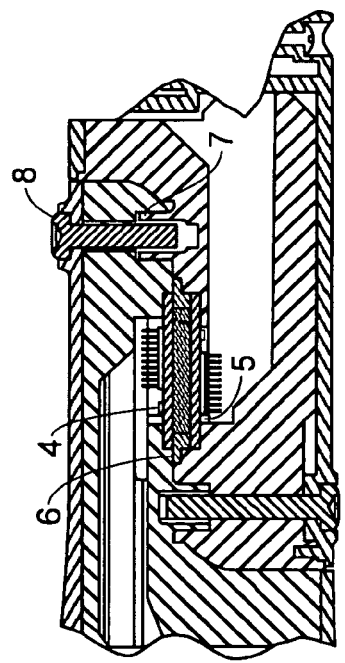

FIGS. 5A through 5C illustrate the coupled base module 1 and antenna module 2. FIG. 5B illustrates a cross section along the direction as illustrated in FIG. 5A. FIG. 5C illustrates a cross section along the direction as illustrated in FIG. 5A.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A locator that locates underground objects, comprising:
a base module; and
an antenna module,
wherein the base module and the antenna module are electrically and mechanically coupled in a removable fashion to form the locator; and
wherein the locator is able to locate underground objects only when the base module and the antenna module are coupled.

2. The locator of claim 1, wherein the locator is a line locator that locates underground conductors.

3. The locator of claim 1, wherein the locator is a marker locator that locates underground markers.

4. A base module of a locator, comprising:
electronics for receiving and processing data from an antenna module to locate an underground object;
an electrical coupler for accepting an electrical connection to the antenna module; and
a mechanical coupler for mechanically coupling to the antenna module;
wherein the base module is able to locate an underground object only when coupled with the antenna module.

5. The base module of claim 4, wherein the locator is a line locator that locates underground conductors.

6. The base module of claim 4, wherein the locator is a marker locator that locates underground markers.

7. An antenna module for a locator, comprising:
at least one electromagnetic field detector;
an electrical coupler for accepting an electrical connection to a base module, the base module receiving signals from the at least one electromagnetic field detector to locate an underground object; and
a mechanical coupler for mechanically coupling to the base module;
wherein the locator is able to locate an underground object only when the base module and the at least one electromagnetic field detector are coupled.

8. The antenna module of claim 7, wherein the locator is a line locator that locates underground conductors.

9. The antenna module of claim 7, wherein the locator is a marker locator that locates underground markers.

* * * * *

UNITED STATES PATENT AND TRADEMARK OFFICE
CERTIFICATE OF CORRECTION

PATENT NO.         : 7,612,682 B2                                               Page 1 of 1
APPLICATION NO.    : 11/445085
DATED              : November 3, 2009
INVENTOR(S)        : Greg Staples It is certified that error appears in the above-identified patent and that said Letters Patent is hereby corrected as shown below:

On the title page, line (75) Inventors, replace "Walte" with --Waite--.

Signed and Sealed this
Thirteenth Day of March, 2012

David J. Kappos
*Director of the United States Patent and Trademark Office*